United States Patent
Kim et al.

(10) Patent No.: US 10,198,615 B2
(45) Date of Patent: Feb. 5, 2019

(54) FINGERPRINT ENROLLMENT METHOD AND APPARATUS

(71) Applicant: Samsung Electronics Co., Ltd., Suwon-si (KR)

(72) Inventors: Kyuhong Kim, Seoul (KR); Namjoon Kim, Anyang-si (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 15/629,324

(22) Filed: Jun. 21, 2017

(65) Prior Publication Data
US 2018/0129861 A1     May 10, 2018

(30) Foreign Application Priority Data
Nov. 7, 2016 (KR) .......................... 10-2016-0147401

(51) Int. Cl.
*G06K 9/00*     (2006.01)
*G06F 17/30*     (2006.01)

(52) U.S. Cl.
CPC ..... *G06K 9/00087* (2013.01); *G06F 17/3028* (2013.01); *G06F 17/30256* (2013.01); *G06K 9/00013* (2013.01); *G06K 9/00026* (2013.01)

(58) Field of Classification Search
None
See application file for complete search history.

(56) References Cited

U.S. PATENT DOCUMENTS

| | | | |
|---|---|---|---|
| 8,005,277 B2 | 8/2011 | Tulyakov et al. | |
| 8,509,500 B2 | 8/2013 | Yamada | |
| 2005/0129290 A1* | 6/2005 | Lo .................. | G06K 9/00067 382/124 |
| 2010/0232659 A1 | 9/2010 | Rahmes et al. | |
| 2013/0272586 A1 | 10/2013 | Russo | |
| 2015/0074615 A1 | 3/2015 | Han et al. | |
| 2016/0042247 A1 | 2/2016 | Russo et al. | |
| 2016/0117545 A1 | 4/2016 | Chiang et al. | |

FOREIGN PATENT DOCUMENTS

| | | |
|---|---|---|
| KR | 10-0819457 B1 | 4/2008 |
| KR | 10-2011-0114191 A | 10/2011 |
| KR | 10-1237148 B1 | 2/2013 |
| KR | 10-1246276 B1 | 3/2013 |
| KR | 10-1270348 B1 | 5/2013 |

* cited by examiner

*Primary Examiner* — Mark Roz
(74) *Attorney, Agent, or Firm* — NSIP Law

(57) ABSTRACT

A processor fingerprint enrollment method and apparatus is disclosed. A processor implemented fingerprint enrollment method includes performing a matching between a received input fingerprint image of a user and one or more enrolled fingerprint images, and selectively, based on a result of the matching identifying a matched enrolled fingerprint image from the one or more enrolled fingerprint image and based on a calculated degree of diversity in the fingerprint corresponding to an overlapping region between the input fingerprint image and the matched enrolled fingerprint image, storing the input fingerprint as another enrolled fingerprint image.

29 Claims, 13 Drawing Sheets

FINGERPRINT ENROLLMENT METHOD AND APPARATUS

CROSS-REFERENCE TO RELATED APPLICATION(S)

This application claims the benefit under 35 USC § 119(a) of Korean Patent Application No. 10-2016-0147401 filed on Nov. 7, 2016, in the Korean Intellectual Property Office, the entire disclosure of which is incorporated herein by reference for all purposes.

BACKGROUND

1. Field

The following description relates to a fingerprint enrollment method and apparatus.

2. Description of Related Art

Biometrics-based authentication technology may be used to authenticate a user, for example, a fingerprint, an iris, a voice, a face, and blood vessels. Such biological characteristics used for such user authentication differ from individual to individual, rarely change during a lifetime, and have a low risk of being stolen or copied. In addition, individuals do not need to intentionally carry such characteristics at all times, and thus may not suffer an inconvenience using the biological characteristics.

Currently, fingerprint recognition approaches are most commonly used due to their high level of convenience, security, and economic efficiency. A fingerprint recognition approach may reinforce security of a user device and enable a user to receive various application services, for example, mobile payment, more readily.

User authentication using a fingerprint may start with enrolling a fingerprint image to be used for fingerprint verification and storing the enrolled fingerprint image. Subsequently, when a fingerprint image newly received from a user requesting the authentication corresponds to the enrolled fingerprint image, the user may be authenticated as an enrolled user.

Recently, as portable devices have become smaller in size, the size of the fingerprint sensing region included in such a portable device have also decreased.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor implemented fingerprint enrollment method includes performing a matching between a received input fingerprint image of a user and one or more enrolled fingerprint images, selectively, based on a result of the matching identifying a matched enrolled fingerprint image from the one or more enrolled fingerprint image and based on a calculated degree of diversity in the fingerprint corresponding to an overlapping region between the input fingerprint image and the matched enrolled fingerprint image, storing the input fingerprint as another enrolled fingerprint image.

The selective storing of the input fingerprint may further include extracting, in response to the matching identifying the matched enrolled fingerprint, the overlapping region as between the input fingerprint image and the matched enrolled fingerprint image, calculating the degree of diversity in the fingerprint corresponding to the extracted overlapping region, and selectively storing the input fingerprint image as the other enrolled fingerprint image based on the calculated degree of diversity.

The selective storing of the input fingerprint image may include selecting, dependent on the calculated degree of diversity, between a first of storing the input fingerprint image as the other enrolled fingerprint image and a second of requesting the user to input another finger fingerprint image and not storing the input fingerprint image as the other enrolled fingerprint image.

The selective storing of the input fingerprint image may further include, dependent on a determined total number of stored enrolled fingerprint images and/or a calculated effective area size corresponding the stored enrolled fingerprint images, not requesting the user to input the other fingerprint image and ceasing an enablement process of the enablement method.

The method may further include calculating the degree of diversity in the fingerprint corresponding to the extracted overlapping region, including calculating a similarity score between the input fingerprint image and the matched enrolled fingerprint image based on a calculated similarity corresponding to the overlapping region, wherein, a relationship between the similarity score and the degree of diversity may exist such that, in response to an increase in the similarity score, the degree of diversity decreases, and in response to a decrease in the similarity score, the degree of diversity increases.

The calculating of the similarity score may include calculating a shared image similarity between a first shared image portion of the input fingerprint image corresponding to the overlapping region and a second shared image portion of the matched enrolled fingerprint image corresponding to the overlapping region, and calculating the similarity score based on the calculated shared image similarity and a determined size of the overlapping region.

The calculating of the similarity score may include calculating the shared image similarity based on a normalized cross correlation (NCC) or a phase correlation between the input fingerprint image and the matched enrolled fingerprint image.

The calculating of the similarity score may include calculating a shared area ratio based on a first ratio between a size of the overlapping region and a size of the input fingerprint image or based on a second ratio between the size of the overlapping region and a size of the matched enrolled fingerprint image, and calculating the similarity score based on the calculated shared area ratio and the calculated similarity.

In response to the calculated similarity meeting a similarity threshold, the shared area ratio may be the first ratio or the second ratio, in response to the similarity failing to meet the similarity threshold, the shared area ratio may be a predefined value, and the similarity score may be based on a multiplication of the shared area ratio and the calculated similarity.

The method may further include determining whether to cease a fingerprint enrollment process, including calculating an enrollment score of plural enrolled fingerprint images, including the one or more enrolled fingerprint images and the stored other enrolled fingerprint image, based on a number of the plural enrolled fingerprint images and similarity scores between the plural enrolled fingerprint image, and determining whether to cease the fingerprint enrollment process by comparing the enrollment score to a threshold score.

The calculating of the enrollment score may include calculating the enrollment score to be at least one $S_{enroll}$ of:

$$S_{Enroll} = \frac{m(m-1)}{2} - \sum_{i=1}^{m-1}\sum_{j=i+1}^{m} s_{ij} + \sum_{i=1}^{m-2}\sum_{j=i+1}^{m-1}\sum_{k=j+1}^{m} s_{ij}s_{jk},$$

$$S_{Enroll} = \frac{m(m-1)}{2} - \sum_{i=1}^{m-1}\max_{i<j\leq m} s_{ij},$$

$$S_{Enroll} = \sum_{i=1}^{m}\left(1 - \max_{1\leq j\leq m, j\neq i} s_{ij}\right), \text{ or}$$

$$S_{Enroll} = \frac{m(m-1)}{2} - \sum_{i=1}^{m-1}\sum_{j=i+1}^{m} s_{ij},$$

wherein m denotes the number of the plural enrolled fingerprint images, and $S_{ij}$ denotes a similarity score between an i-th enrolled fingerprint image and a j-th enrolled fingerprint image of the plural enrolled fingerprint images.

The method may further include determining whether to cease a fingerprint enrollment process, including updating respective degrees of diversity corresponding to the overlapping region of plural enrolled fingerprint images, including the one or more enrolled fingerprint images and the stored other enrolled fingerprint image, based on the calculated degree of diversity, calculating an effective area size of the plural enrolled fingerprint images based on the updated degrees of diversity, and determining whether to cease the fingerprint enrollment process by comparing the calculated effective area size to a threshold area size.

A relationship between a size of the overlapping region and the effective area size may exists such that, in response to an increase in size of overlapping region of the plural enrolled fingerprint images, the effective area size decreases, and a relationship between the updated respective degrees of diversity and the effective area size may exist such that, in response to an increase in the updated degrees of diversity, the effective area size increases.

The method may further include calculating the degree of diversity in the fingerprint, where a result of the calculating of the degree of diversity may be dependent on at least one of a direction of a fingerprint corresponding to the input fingerprint image, a direction, a distribution, and a magnitude of a finger pressure corresponding to the input fingerprint image, and a humidity and/or other condition of a portion of skin corresponding to the input fingerprint image.

The matching may include obtaining at least one phase correlation between the input fingerprint image and the one or more enrolled fingerprint images based on a frequency-based matching method, obtaining at least one of a translation, a rotation, or a scale between the input fingerprint image and the one or more enrolled fingerprint images based on the obtained phase correlation, and determining whether, and which of, any of the one or more enrolled fingerprint images match the input fingerprint image based on at least one of the obtained translation, the obtained rotation, or the obtained scale.

The method may further include performing a recognition process to compare the input fingerprint image or another input fingerprint image to at least the one or more enrolled fingerprint images and selectively enable user access to stored information of a computing device that performs a fingerprint enrollment process including the selective storing the input fingerprint image as another enrolled fingerprint image.

In one general aspect, a processor implemented fingerprint enrollment method includes comparing an input fingerprint image of a user to multiple enrolled fingerprint images, to recognize the input fingerprint image as having matched correspondence to an enrolled fingerprint of the user based on a result of the comparing, measuring respective degrees of diversity corresponding to one or more overlapping regions between the recognized input fingerprint image and one or matched enrolled fingerprint images of the multiple enrolled fingerprint images, and determining whether to enroll the input fingerprint image based on the measured respective degrees of diversity.

In on general aspect, there is provided a non-transitory computer-readable storage medium storing instructions, that when executed by a processor, cause the processor to perform one or more or all of the processes described herein.

In one general aspect, a fingerprint enrollment apparatus includes a fingerprint sensor configured to receive an input fingerprint image of a user, and a processor configured to perform a matching of the input fingerprint image to one or more enrolled fingerprint images, and, in response to the matching identifying a matched enrolled fingerprint image, extract an overlapping region between the input fingerprint image and the matched enrolled fingerprint image, calculate a degree of diversity in the fingerprint corresponding to the overlapping region, and determine whether to store the input fingerprint image as another enrolled fingerprint image based on the calculated degree of diversity.

The processor may be configured to calculate a similarity score between the input fingerprint image and the matched enrolled fingerprint image based on a calculated similarity corresponding to the overlapping region, where, a relationship between the similarity score and the degree of diversity may exist such that, in response to an increase in the similarity score, the degree of diversity decreases, and in response to a decrease in the similarity score, the degree of diversity increases.

The processor may be configured to calculate a shared image similarity between a first shared image portion of the input fingerprint image corresponding to the overlapping region and a second shared image portion of the matched enrolled fingerprint image corresponding to the overlapping region, and calculate the similarity score based on the calculated shared image similarity and a determined size of the overlapping region.

The processor may be configured to calculate a shared area ratio based on a first ratio between a size of the overlapping region and a size of the input fingerprint image or based on a second ratio between the size of the overlapping region and a size of the matched enrolled fingerprint image, and calculate the similarity score based on the calculated shared area ratio and the similarity.

The processor may be configured to calculate an enrollment score of plural enrolled fingerprint images, including the one or more enrolled fingerprint images and the stored other enrolled fingerprint image, based on a number of the plural enrolled fingerprint images and similarity scores of the plural enrolled fingerprint images, and determine whether to cease a fingerprint enrollment process by comparing the calculated enrollment score to a threshold score.

The processor may be configured to update respective degrees of diversity corresponding to the overlapping region of plural enrolled fingerprint images, including the one or more enrolled fingerprint images and the stored other enrolled fingerprint image, based on the calculated degree of diversity, calculate an effective area size of the plural enrolled fingerprint images based on the updated respective degrees of diversity, and determine whether to cease a fingerprint enrollment process by comparing the calculated effective area size to a threshold area size.

The processor may be configured to perform a recognition process to compare the input fingerprint image or another input fingerprint image to at least the one or more enrolled fingerprint images to selectively enable user access to stored information of the enrollment apparatus.

The apparatus may further include another fingerprint sensor, and the processor may be further configured to perform the recognition process to compare the other input fingerprint image captured by the other fingerprint sensor to at least the one or more enrolled fingerprint images and selectively enable user access to stored information of the enrollment apparatus based on a result of the recognition process, and the other fingerprint sensor may have a different image capturing configuration than the fingerprint sensor, so as to capture a different fingerprint image shape or size than captured by the fingerprint sensor.

In one general aspect, an enrollment apparatus includes a processor configured to perform a matching of an input bio-image of a user to one or more enrolled bio-images, and, in response to the matching identifying a matched enrolled bio-image, extract an overlapping region between the input bio-image image and the matched enrolled bio-image image, calculate a degree of diversity in the bio-image corresponding to the overlapping region, and determine whether to store the input bio-image as another enrolled bio-image image based on the calculated degree of diversity.

The apparatus may further include a bio-sensor configured to receive the input bio-image of the user.

The bio-sensor may be a fingerprint sensor configured to capture only a portion of a corresponding fingerprint corresponding to a sensor area of the fingerprint sensor, with the input bio-image being a corresponding input fingerprint image of only the portion of the corresponding fingerprint.

Other features and aspects will be apparent from the following detailed description, the drawings, and the claims.

Figure 1:
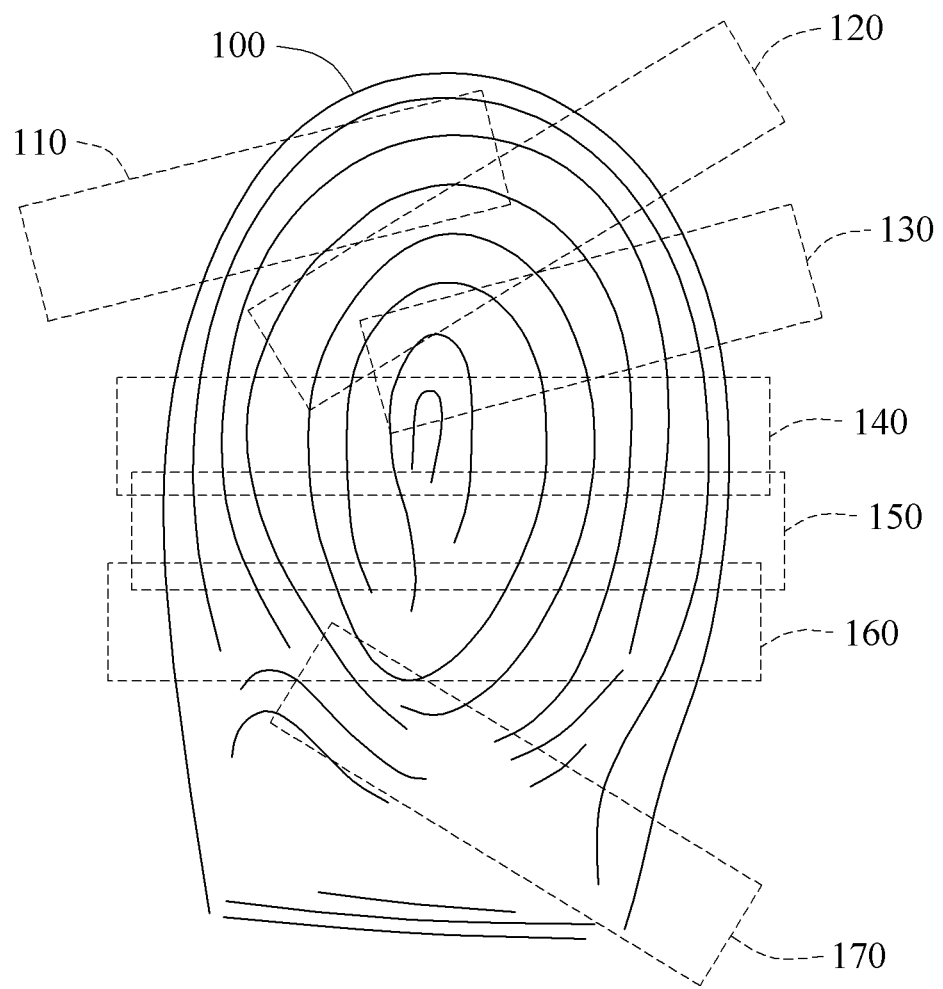
FIGS. 1 and 2 are diagrams illustrating examples of fingerprint images.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the terms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between"

and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Examples to be described hereinafter may be embodied in various forms of products, for example, a personal computer (PC), a laptop computer, a tablet PC, a smartphone, a television (TV), a smart home appliance, an intelligent vehicle, a kiosk, and a wearable device. For example, the examples may be applicable to user recognition used in, for example, a smartphone, a mobile device, and a smart home system. In addition, the examples may be applicable to a payment service based on user recognition. Further, the examples may also be applicable to a smart vehicle system that is automatically started through user recognition. Hereinafter, example embodiments are described in detail with reference to the accompanying drawings. Like reference numerals in the drawings denote like elements.

Figure 2:
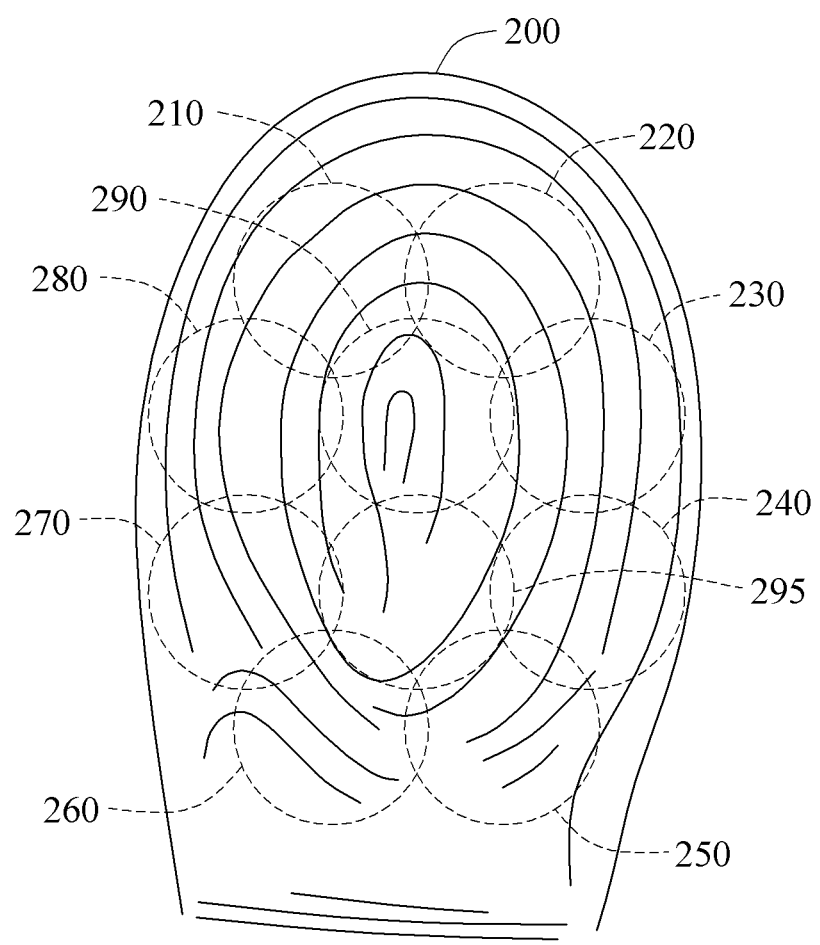

FIGS. 1 and 2 are diagrams illustrating examples of fingerprint images.

Referring to FIG. 1, a fingerprint sensor senses a fingerprint 100 of a user. The fingerprint sensor senses the fingerprint 100 through a sensing region. A size of the sensing region of the fingerprint sensor may be smaller than a size of the fingerprint 100. For example, the sensing region of the fingerprint sensor may be a rectangular shape smaller than the size of the fingerprint 100. In such an example, the fingerprint sensor may sense a portion of the fingerprint 100 through the sensing region.

The fingerprint sensor may generate an image by capturing a sensed fingerprint, and the captured image may herein be referred to as an input fingerprint image, for example. In response to the size of the sensing region of the fingerprint sensor being less than the size of the fingerprint 100, the fingerprint image generated by the fingerprint sensor may correspond to a partial image including a portion of the fingerprint 100.

The fingerprint image may be used to enroll or recognize the fingerprint 100. For example, the fingerprint image may be enrolled in an enrollment process. The enrolled fingerprint image may be stored in a storage provided in advance. In response to the size of the sensing region of the fingerprint sensor being less than the size of the fingerprint 100, a plurality of fingerprint images corresponding to a plurality of partial images of the fingerprint 100 of the user may be enrolled. For example, as illustrated in FIG. 1, a plurality of fingerprint images, for example, fingerprint images 110 through 170, may be enrolled. Each of the fingerprint images 110 through 170 may cover a portion of the fingerprint 100, and the fingerprint images 110 through 170 in combination may cover an entirety of the fingerprint 100. The fingerprint images 110 through 170 may overlap one another. Hereinafter, a fingerprint image already enrolled is referred to as an enrolled fingerprint image.

In addition, an input fingerprint image may be recognized in a recognition process. For example, the input fingerprint image may be compared to an enrolled fingerprint image in the recognition process. A result of an authenticating or identifying of a user may be obtained based on whether the input fingerprint image corresponds to the enrolled fingerprint image, a corresponding computing apparatus may enable a user to access additional functions of the computing apparatus, such as to access stored information or implement other functions of the computing apparatus. In response to the size of the sensing region of the fingerprint sensor being less than the size of the fingerprint 100, for example, or the sensing region being less than the size of the fingerprint 100 for other selective reasons, the input fingerprint image may correspond to a partial image of the fingerprint 100 of the user.

Although the sensing region of the fingerprint sensor is illustrated as having a rectangular shape in FIG. 1, a size and a shape of the sensing region of the fingerprint sensor may vary. For example, as illustrated in FIG. 2, the sensing region of the fingerprint sensor may have a circular shape. In addition, depending on the configuration of the fingerprint sensor, different sizes and shapes may be sensed by a same fingerprint sensor. In an example of FIG. 2, where all of the sensing regions have circular shapes, in the enrollment process, a plurality of fingerprint images, for example, fingerprint images 210 through 295, corresponding to a single fingerprint 200 may be enrolled. In addition, during the subsequent recognition process, a fingerprint image corresponding to a portion of the fingerprint 200 may be compared to the enrolled fingerprint images 210 through 295.

In addition, depending on embodiment, the fingerprint sensor used in the enrollment process may differ from the fingerprint sensor used in the recognition process. For example, the fingerprint sensor having the rectangular-shaped sensing region as illustrated in FIG. 1 may be used in the enrollment process, and the fingerprint sensor having the circular-shaped sensing region as illustrated in FIG. 2 may be used in the recognition process.

Figure 3:
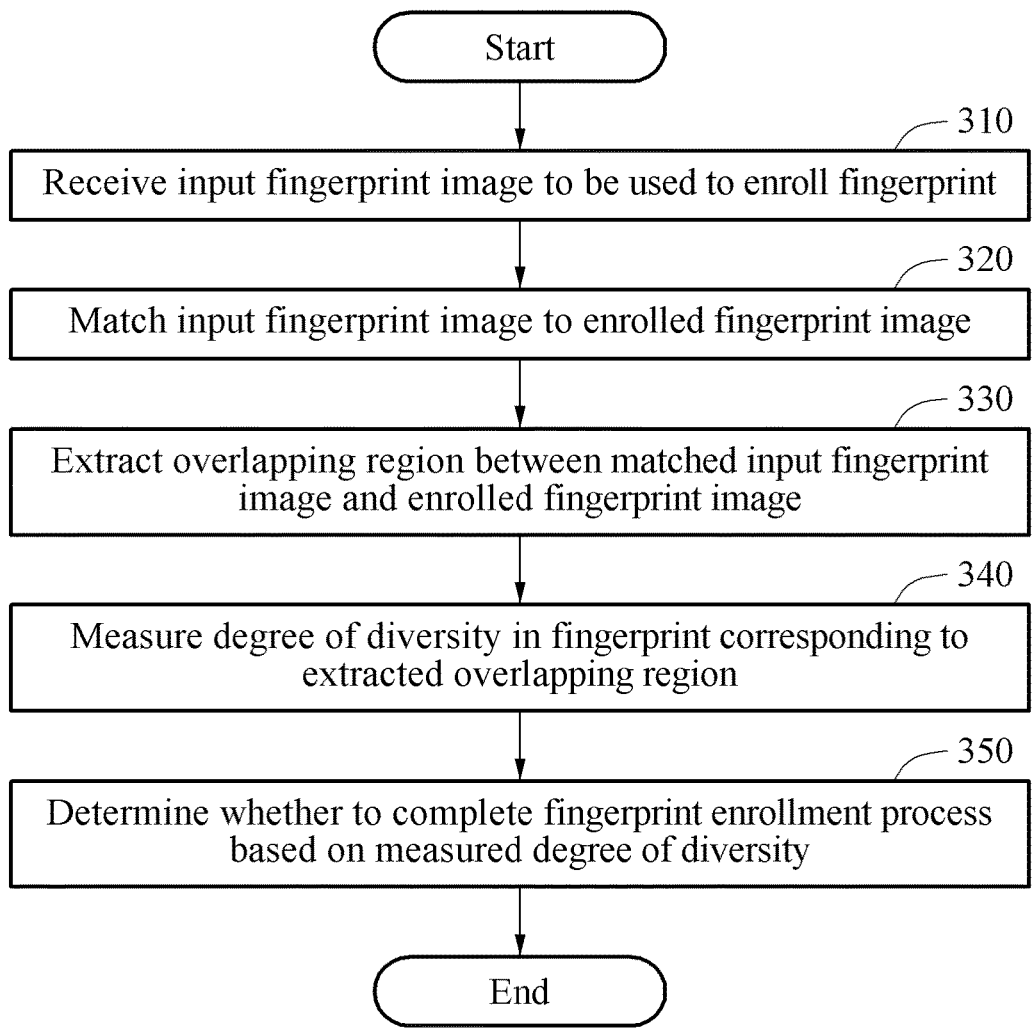
FIG. 3 is a flowchart illustrating an example of a fingerprint enrollment method.

FIG. 3 is a flowchart illustrating an example of a fingerprint enrollment method.

Referring to FIG. 3, in operation 310, a fingerprint enrollment apparatus receives an input fingerprint image to be used for fingerprint enrollment. The fingerprint enrollment apparatus refers to an apparatus used to enroll or recognize a fingerprint of a user. The fingerprint enrollment apparatus may include a fingerprint sensor and a processor, where, for example, the processor may be controlled to implement one or more or all fingerprint enrollment processes and methods described herein through execution of a software module, or such enrollment processes may be implemented through computing hardware that is configured to implement such fingerprint enrollment processes through hardware alone without such executable software. The fingerprint enrollment apparatus may receive the input fingerprint image from the fingerprint sensor, and the input fingerprint image may be a fingerprint image captured by the fingerprint sensor that may indicate only a portion of a fingerprint of a user, for example. As described with reference to FIGS. 1 and 2, depending on embodiment, a size of a sensing region of the fingerprint sensor may be smaller than a size of the fingerprint of the user, and thus a size of the fingerprint image may be such so as to illustrate less than the full fingerprint.

In operation 320, the fingerprint enrollment apparatus matches the input fingerprint image to an enrolled fingerprint image. The matching of the input fingerprint image to the enrolled fingerprint image refers to an operation of searching, based on the input fingerprint image, for a portion of any of the enrolled fingerprint images shared with the input fingerprint image, and may further include, scaling up or down, rotating, and/or translating of the input fingerprint image relative to the enrolled fingerprint images to overlap the shared portion. An example of a method of the matching will be described with reference to FIG. 9. The fingerprint enrollment apparatus may obtain a plurality of enrolled fingerprint images from a database provided in advance. The database may be embodied as a memory included in the fingerprint enrollment apparatus, or an external device, for example, a server connectable to the fingerprint enrollment apparatus through a wire or a network, or wirelessly through a user interface of the fingerprint enrollment apparatus. In addition, in an example, the enrollment process may further include an initial operation where a first received fingerprint image is stored as an enrolled fingerprint image.

Accordingly, with such circumstance, it is found that there is a desire for technology for enrolling and verifying a fingerprint using a sensor configured to sense a portion of a fingerprint. However, due to current technological approaches, current enrollment and/or recognition processes are inefficient and slow. Accordingly, one or more embodiments described herein may improve on such technological failures and improve fingerprint enrollment and recognition efficiency and/or speed.

Figure 4:
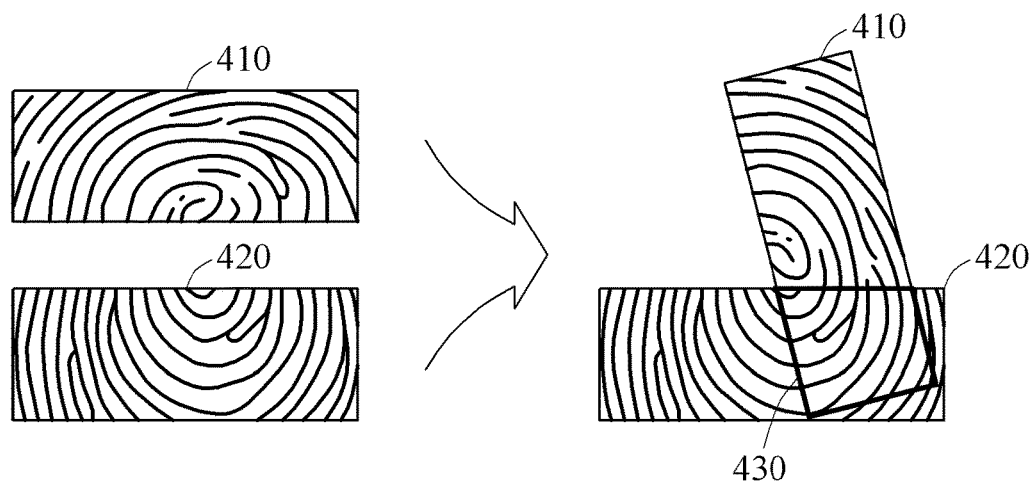
FIG. 4 is a diagram illustrating an example of an input fingerprint image and an enrolled fingerprint image.

Referring to FIG. 4, the fingerprint enrollment apparatus matches an input fingerprint image 410 to an enrolled fingerprint image 420. The fingerprint enrollment apparatus extracts a shared portion between the input fingerprint image 410 and the enrolled fingerprint image 420 from the input fingerprint image 410 and the enrolled fingerprint image 420, and scales up or down, rotates, and/or translates the input fingerprint image 410 to allow extracted respective shared portions to overlap each other. In this example, the enrolled fingerprint image 420 may be one of a plurality of enrolled fingerprint images stored in a database, and the fingerprint enrollment apparatus may perform the matching operation of the input fingerprint image 410 to each of the enrolled fingerprint images.

Referring back to FIG. 3, in operation 330 and based on results of the matching operation, the fingerprint enrollment apparatus extracts an overlapping region between the matched input fingerprint image and the enrolled fingerprint image, i.e., between the input fingerprint image and the resultant matched enrolled fingerprint image identified in the matching operation. The overlapping region, for example, an overlapping region 430 as illustrated in FIG. 4, refers to a spatial area with a size corresponding to the shared portion between the input fingerprint image 410 and the enrolled fingerprint image 420. The overlapping region 430 may be distinguished between a partial image of the input fingerprint image 410 and a partial image of the enrolled fingerprint image 420, such that the overlapping region 430 can be considered from the perspective of the partial image of the input fingerprint image 410 and from the perspective of the partial image of the enrolled fingerprint image 420.

Thus, referring back to FIG. 3, in operation 340, the fingerprint enrollment apparatus measures a degree of diversity in the fingerprint of the user corresponding to the overlapping region 430. The degree of diversity in the fingerprint corresponding to the overlapping region 430 may be a measure indicating how diverse images correspond to the overlapping region. Accordingly, an image corresponding to the overlapping region 430 from the perspective of the matched input fingerprint image 410, i.e., in the matched fingerprint image 410, is referred to as a first shared image, and an image corresponding to the overlapping region 430 from the perspective of the enrolled fingerprint image 420, i.e., in the enrolled fingerprint image 420, is referred to as a second shared image. The fingerprint enrollment apparatus measures the degree of diversity corresponding to the overlapping region 430 based on the first shared image and the second shared image. In response to a determination that there is great difference between information included in the first shared image and information included in the second shared image, the degree of diversity in the fingerprint of the user corresponding to the overlapping region 430 may be determined to be great.

Figure 5A:
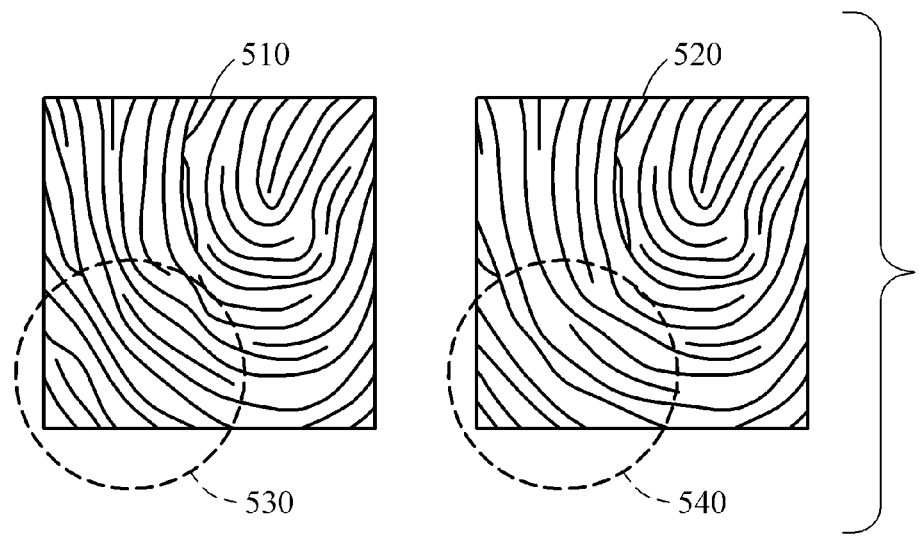
FIGS. 5A and 5B are diagrams illustrating an example of images corresponding to an overlapping region.

Referring to FIG. 5A, an image 510 and an image 520 are images corresponding to an overlapping region in an input fingerprint image and in an enrolled fingerprint image. For example, the image 510 may correspond to the first shared image corresponding to the overlapping region 430 in the matched input fingerprint image 410 of FIG. 4, and the image 520 may correspond to the second shared image corresponding to the overlapping region 430 in the enrolled fingerprint image 420 of FIG. 4. Although the image 510 and the image 520 correspond to the overlapping region 430 and represent a same fingerprint, a fingerprint distribution of a portion 530 of the image 510 may be concentrated in one direction compared to a portion 540 of the image 520, such as due to the distribution of pressure by a finger becoming different when inputting the fingerprint. The fingerprint enrollment apparatus measures a degree of diversity in a fingerprint of a user corresponding to the overlapping region 430 based on information included in the portion 530 of the image 510 and information included in the portion 540 of the image 520.

Figure 5B:
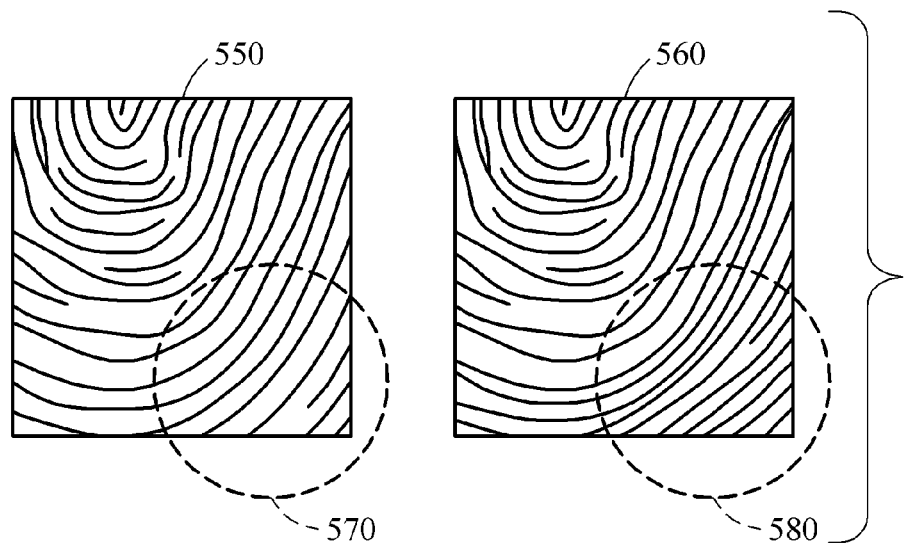

Referring to FIG. 5B, an image 550 and an image 560 are also respective first and second shared images corresponding to an overlapping region 430 in an input fingerprint image and in an enrolled fingerprint image. Although the image 550 and the image 560 correspond to the overlapping region 430 illustrated in FIG. 4 and represent a same fingerprint, a distance between ridges of the fingerprint may be different in response to the magnitude of pressure of the finger becoming different when inputting the fingerprint, as observed through a comparison between a portion 570 of the image 550 and a portion 580 of the image 560. In such a case, the image 550 and the image 560 may be determined to represent different textures. The fingerprint enrollment apparatus measures a degree of diversity in a fingerprint of a user corresponding to the overlapping region 430 based on information included in the portion 570 of the image 550 and a portion 580 of the image 560.

As illustrated in FIGS. 5A and 5B, fingerprint images representing a same fingerprint may include different portions having different diversity conditions dependent on the situations and conditions when the fingerprint was input, for example, at least one of a direction of the fingerprint, a direction and a magnitude of a pressure of a finger, a humidity and/or other conditions of a corresponding portion of skin. In addition, a fingerprint image may include a portion partially degraded due to various reasons. For example, the fingerprint image may be deformed by pressure generated by the pressing of the finger on the sensor.

When an input fingerprint image is generated, pressures applied to each portion of a sensing region of a fingerprint sensor may vary. Thus, at least a portion of the input fingerprint image may be deformed. In addition, an enrolled fingerprint image may be degraded due to various reasons.

Although the first shared image, for example, the image 510 or the image 550, and the second shared image, for example, the image 520 or the image 560, include different portions corresponding to a same fingerprint, the fingerprint enrollment apparatus may employ a method of increasing a degree of diversity in a fingerprint of a user corresponding to the overlapping region 430 without excluding the input fingerprint image from a target to be enrolled in a fingerprint enrollment process, and thus increase a speed of the fingerprint enrollment process. Rather, previously such an input fingerprint image 410 corresponding to either or both of image 510 and 550 may have been excluded from enrollment. As noted, the degree of diversity may be affected by a situation and condition of a time at which the fingerprint is input.

Referring back to FIG. 4, based on a similarity corresponding to the overlapping region 430, the fingerprint enrollment apparatus calculates a similarity score between the matched input fingerprint image 410 and the enrolled fingerprint image 420. The fingerprint enrollment apparatus measures a degree of diversity in a fingerprint of a user based on the calculated similarity score. For example, a greater similarity score may represent a lower degree of diversity and a lower similarity score may represent a greater degree of diversity, or said another way, in response to an increase in the similarity score, the degree of diversity may decrease, and in response to a decrease in the similarity score, the degree of diversity may increase. Based on such a relationship between the similarity score and the degree of diversity, the fingerprint enrollment apparatus may measure the degree of diversity in the fingerprint of the user.

The fingerprint enrollment apparatus calculates a similarity between the first shared image and the second shared image. For example, the fingerprint enrollment apparatus may calculate the similarity between the first shared image and the second shared image based on a normalized cross correlation (NCC) or a phase correlation between the matched input fingerprint image 410 and the enrolled fingerprint image 420. The fingerprint enrollment apparatus may calculate an image brightness value-based NCC using the below Equation 1, for example.

$$ncc(I_1, I_2) = \frac{\sum_{(i,j) \in W} I_1(i,j) \cdot I_2(x+i, y+j)}{\sqrt[2]{\sum_{(i,j) \in W} I_1^2(i,j) \cdot \sum_{(i,j) \in W} I_2^2(x+i, y+j)}}$$

Equation 1

In Equation 1, $ncc(I_1, I_2)$ denotes an NCC between an image $I_1$ and an image $I_2$, and W denotes an overlapping region between the image $I_1$ and the image $I_2$. A value of $ncc(I_1, I_2)$ is closer to 1 when the image $I_1$ and the image $I_2$ are more similar in the overlapping region W.

In Equation 1, image $I_1$ may correspond to the matched input fingerprint image 410, and the image $I_2$ may correspond to the enrolled fingerprint image 420, with i and j denoting an x-axis coordinate and a y-axis coordinate, respectively, of a pixel in the overlapping region W. The variables x and y denote translation information in an x-axis direction (Tx) and translation information in a y-axis direction (Ty), respectively. $I_1(i, j)$ denotes a pixel value in (i, j) coordinates of the image $I_1$, and $I_2(x+i, y+j)$ denotes a pixel value in (x+i, y+j) coordinates. The NCC between the image $I_1$ and the image $I_2$ indicates a correlation corresponding to the overlapping region between the matched input fingerprint image 410 and the enrolled fingerprint image 420. Thus, the fingerprint enrollment apparatus may employ, as the similarity between the first shared image and the second shared image, the NCC between the image $I_1$ and the image $I_2$ that is calculated using Equation 1.

The fingerprint enrollment apparatus may calculate a similarity score between the matched fingerprint image 410 and the enrolled fingerprint image 420 based on the calculated similarity and a size of the overlapping region 430. In an example, the fingerprint enrollment apparatus calculates a shared area ratio based on a ratio between the size of the overlapping region 430 and a size of the matched input fingerprint image 410 (hereinafter referred to as a first ratio), or a ratio between the size of the overlapping region 430 and a size of the enrolled fingerprint image 420 (hereinafter referred to as a second ratio). In an example, the size of the input fingerprint image 410 and the size of the enrolled fingerprint image 420 may be defined by a size of a sensing region of a fingerprint sensor, and thus may be equal to each other. In such a case, the first ratio and the second ratio may be equal to each other.

In another example, the fingerprint enrollment apparatus calculates the shared area ratio based on a ratio between the size of the overlapping region 430 and a sum of the size of the matched input fingerprint image 410 and the size of the enrolled fingerprint image 420. In a case that the size of the matched input fingerprint image 410 and the size of the enrolled fingerprint image 420 differ from each other, using the sum of the size of the matched input fingerprint image 410 and the size of the enrolled fingerprint image 420 may be effective.

Accordingly, the fingerprint enrollment apparatus may calculate the similarity score based on the shared area ratio and the similarity. For example, in response to the calculated similarity meeting a threshold similarity, e.g., being greater than or equal to the threshold similarity, the fingerprint enrollment apparatus measures the shared area ratio based on the first ratio and the second ratio. Conversely, in response to the calculated similarity not meeting the threshold similarity, e.g., being less than the threshold similarity, the fingerprint enrollment apparatus sets the shared area ratio to be a predefined value. In response to the calculated similarity between the first shared image and the second shared image being excessively small, for example, the calculated similarity failing to meet the threshold similarity, the first shared image and the second shared image may be excluded from the measuring of the degree of diversity in the fingerprint of the user. The fingerprint enrollment apparatus may calculate the shared area ratio using the below Equation 2, for example.

Equation 2

$$r_{overlap}(I_1, I_2) = \begin{cases} \frac{\text{size of overlapping area}}{\text{size of input fingerprint image or size of enrolled fingerprint image}}, \\ \text{constant } (ex, 0), \text{ otherwise} \end{cases}$$

if $ncc(I_1, I_2) > ncc_{thres}$

In Equation 2, $r_{overlap}(I_1, I_2)$ denotes a shared area ratio between an image $I_1$ and an image $I_2$, and the image $I_1$ may be the matched input fingerprint image 410 and the image $I_2$ may be the enrolled fingerprint image 420. As noted above, $ncc(I_1, I_2)$ denotes a similarity between the image $I_1$ and the image $I_2$, and, thus, $ncc_{thres}$ denotes a threshold similarity. For example, if a size of an input fingerprint image or a size of an enrolled fingerprint image is 10 and a size of an overlapping region is 7, a value of $r_{overlap}(I_1, I_2)$ may be 0.7.

The fingerprint enrollment apparatus may calculate a similarity score based on a multiplication of the shared area ratio and the similarity. The fingerprint enrollment apparatus may calculate the similarity score using the below Equation 3, for example.

$$s_{12} = s_{overlap}(I_1, I_2) = \text{ncc}(I_1, I_2) \times r_{overlap}(I_1, I_2) \quad \text{Equation 3:}$$

In Equation 3, $s_{12}$ and $s_{overlap}(I_1, I_2)$ denote a similarity score between an image $I_1$ and an image $I_2$, and the image $I_1$ may be the matched input fingerprint image 410 and the image $I_2$ may be the enrolled fingerprint image 420. The $\text{ncc}(I_1, I_2)$ denotes the similarity between the image $I_1$ and the image $I_2$, and the $r_{overlap}(I_1, I_2)$ denotes a shared area ratio between the image $I_1$ and the image $I_2$.

The fingerprint enrollment apparatus calculates the similarity score between the matched input fingerprint image 410 and the enrolled fingerprint image 420, and measures the degree of diversity in the fingerprint of the user corresponding to the overlapping region 430 using the calculated similarity score. Although the calculating of the similarity score is described above, examples of a method of measuring a degree of diversity in a fingerprint of a user is not limited thereto. Depending on embodiment, various applied methods may be applied to define a degree of diversity in information corresponding to the overlapping region 430.

Referring back to FIG. 3, in operation 350, the fingerprint enrollment apparatus determines whether to complete a fingerprint enrollment process for the example fingerprint image 410 based on the degree of diversity. The fingerprint enrollment process refers to a process of enrolling fingerprints, of which one or more or all may be needed/required to be matched to identify or verify a fingerprint input in a recognition process. When information quantities of enrolled fingerprint images and related values satisfy a preset standard, the fingerprint enrollment process may be completed. For example, when a number of enrolled fingerprint images representing a same fingerprint of a user exceeds a predefined number, or a size of area region covered by the enrolled fingerprint images exceeds a predefined size, the fingerprint enrollment process may be completed and thus cease. In an example, upon cessation, the fingerprint enrollment apparatus may indicate to the user through a user interface that the fingerprint enrollment for the current fingerprint is complete, and may proceed to enrollment of a next fingerprint or cease all fingerprint enrollments.

The fingerprint enrollment apparatus may determine whether to complete or cease the fingerprint enrollment process based on the degrees of diversity corresponding to overlapping regions among enrolled fingerprint images identified in the matching process, for example. Thus, with the successful enrollment of fingerprint image 410 discussed above with operations of FIG. 3, enrolled fingerprint images may include the input fingerprint image 410 and the enrolled fingerprint image 420, for example, and the fingerprint enrollment apparatus may measure respective degrees of diversity of the enrolled fingerprint images. For example, the fingerprint enrollment apparatus may calculate an enrollment score based on the degrees of diversity, and determine whether to now complete or cease the fingerprint enrollment process, after the addition of the input fingerprint image to the stored enrolled fingerprint images, using the calculated enrollment score. An example of using an enrollment score calculated based on similarity scores is described with reference to FIG. 6.

Figure 6:
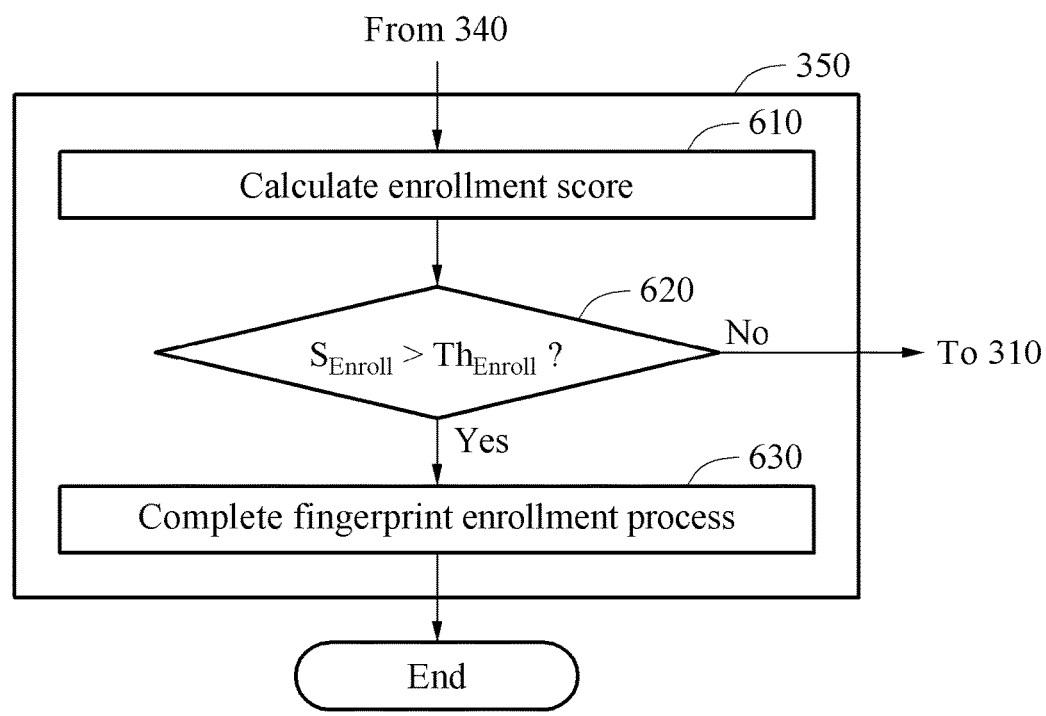
FIG. 6 is a flowchart illustrating an example of a fingerprint enrollment method.

FIG. 6 is a flowchart illustrating an example of a fingerprint enrollment method.

Referring to FIG. 6, in operation 610, the fingerprint enrollment apparatus calculates an enrollment score based on a number of enrolled fingerprint images and similarity scores between the enrolled fingerprint images. The enrolled fingerprint images may include, for example, the matched input fingerprint image 410 and the enrolled fingerprint image 420 of FIG. 4, and the similarity scores may be calculated through matching of image portions between the enrolled fingerprint images by applying the methods described above with respect to FIGS. 3-5. For example, when the number of the enrolled fingerprint images is m, the number of similarity scores may be $_mC_2$.

In operation 620, the fingerprint enrollment apparatus determines whether to complete or cease the fingerprint enrollment process by comparing the enrollment score, for example, $S_{Enroll}$, to a threshold score, for example, $Th_{Enroll}$. In operation 630, in response to the enrollment score meeting, e.g., exceeding, the threshold score, the fingerprint enrollment apparatus completes the fingerprint enrollment process. In response to the enrollment score failing to meet, e.g., not exceeding, the threshold score, the fingerprint enrollment apparatus receives, e.g., requests for and receives, a new input fingerprint image to be used for fingerprint enrollment, and measures a degree of diversity of the new input fingerprint with respect to each matching enrolled fingerprint image.

As described above, to determine whether a sufficient region of the whole fingerprint has been input, e.g., by the repetitively receiving and enrollment considering of input fingerprints of the enrolled user, a shared region between enrolled images may be calculated, and a score corresponding to diversity may be applied. Various methods may be used to calculate a total enrolled size of an input fingerprint using an input size of a partial fingerprint. For example, when a fingerprint of a user is input m number of times, the enrollment apparatus may calculate the enrollment score based on at least one of the below Equations 4 through 7, as only examples. Here, an independent input may increase by 1, and a sharing degree with already input fingerprint images may be excluded.

$$S_{Enroll} = \frac{m(m-1)}{2} - \sum_{i=1}^{m-1} \sum_{j=i+1}^{m} s_{ij} + \sum_{i=1}^{m-2} \sum_{j=i+1}^{m-1} \sum_{k=j+1}^{m} s_{ij}s_{jk} \quad \text{Equation 4}$$

$$S_{Enroll} = \frac{m(m-1)}{2} - \sum_{i=1}^{m-1} \max_{i<j\leq m} s_{ij} \quad \text{Equation 5}$$

$$S_{Enroll} = \sum_{i=1}^{m} \left(1 - \max_{1\leq j\leq m, j\neq i} s_{ij}\right) \quad \text{Equation 6}$$

$$S_{Enroll} = \frac{m(m-1)}{2} - \sum_{i=1}^{m-1} \sum_{j=i+1}^{m} s_{ij} \quad \text{Equation 7}$$

In the equations above, m denotes a number of enrolled fingerprint images, and $S_{ij}$ denotes a similarity score between an i-th enrolled fingerprint image and a j-th enrolled fingerprint image.

Figure 7:
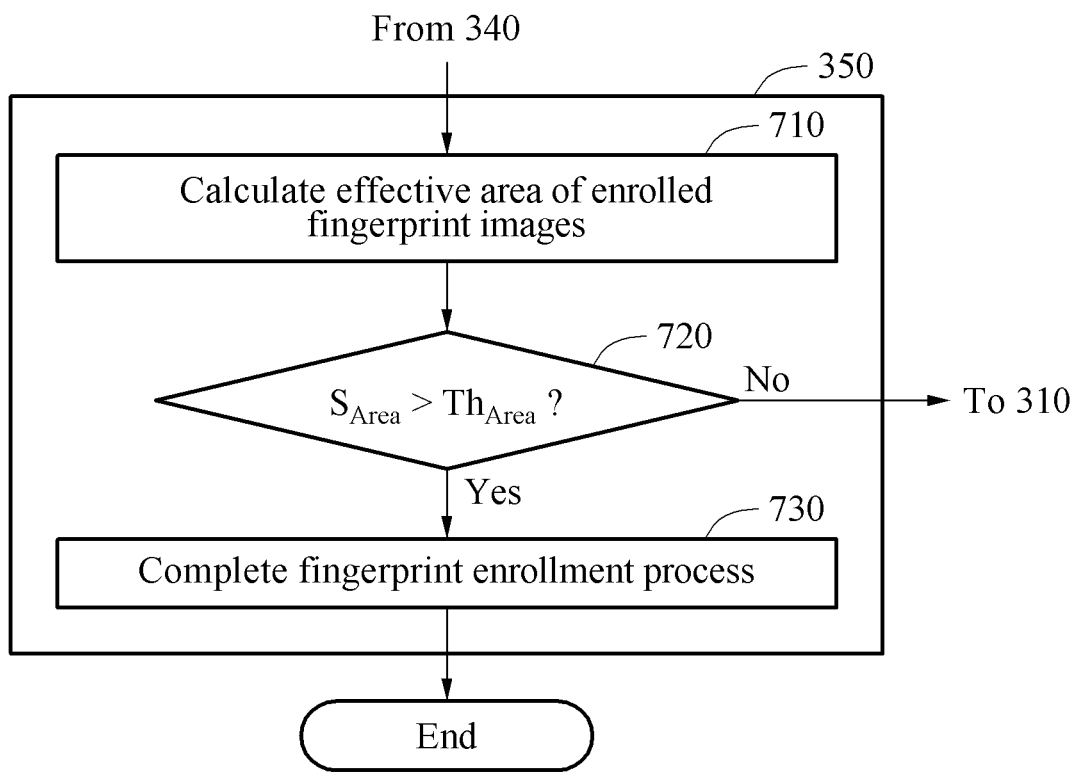
FIG. 7 is a flowchart illustrating an example of a fingerprint enrollment method.

FIG. 7 is a flowchart illustrating an example of a fingerprint enrollment method.

Referring to FIG. 7, in operation 710, the fingerprint enrollment apparatus calculates an effective area size of the enrolled fingerprint images. The effective area size may be defined as an area size obtained by applying the respective degrees of diversity of the enrolled fingerprint images to a total area size of the enrolled fingerprint images. The total area size of the enrolled fingerprint images refers to an area size covered by the enrolled fingerprint images, and may be calculated by subtracting sizes of regions added by overlapping, for example, overlapping regions, from a total sum of area sizes of the enrolled fingerprint images by the number of times of the overlapping.

Figure 8:
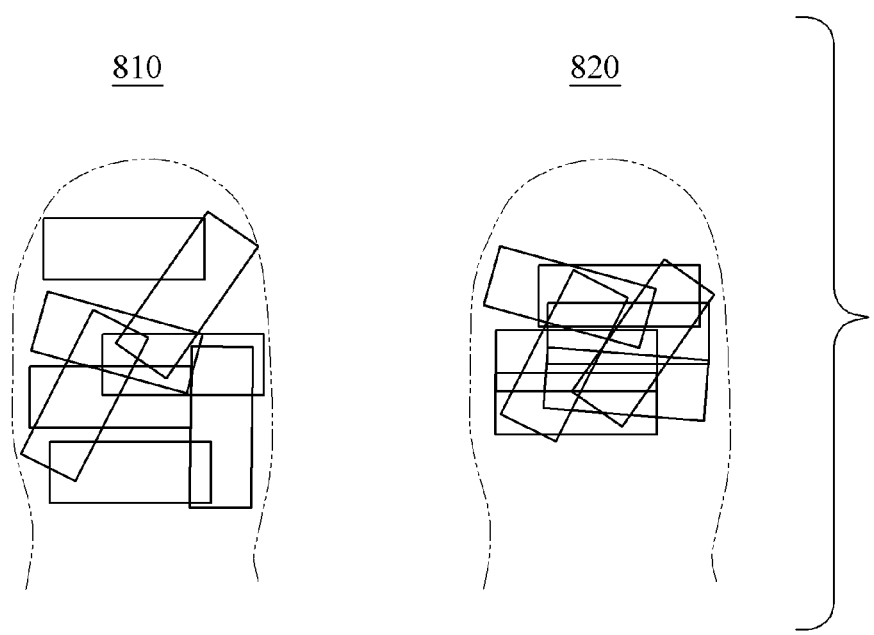
FIG. 8 is a diagram illustrating an example of enrolled fingerprint images.

FIG. 8 illustrates a plurality of enrolled fingerprint images 810 that overlaps one another and a plurality of enrolled fingerprint images 820 that overlaps one another. Although a number of the enrolled fingerprint images 810 is equal to a number of the enrolled fingerprint images 820, the enrolled fingerprint images 820 are distributed more densely than the enrolled fingerprint images 810, and thus a total area size of the enrolled fingerprint images 810 is greater than a total area size of the enrolled fingerprint images 820. However, in response to respective degrees of diversity of the enrolled fingerprint images 820 being greater than respective degrees of diversity of the enrolled fingerprint images 810, an effective area size of the enrolled fingerprint images 820 may be greater than an effective area size of the enrolled fingerprint images 810.

In an example, the fingerprint enrollment apparatus may extract overlapping regions of the current enrolled fingerprint images, e.g., now including the matched input fingerprint image, and update the respective degrees of diversity corresponding to the extracted overlapping regions. For example, the fingerprint enrollment apparatus may have extracted an overlapping region between a newly matched input fingerprint image, i.e., an input fingerprint image just stored as another of the enrolled fingerprint images, and each of the then existing enrolled fingerprint images excluding the input fingerprint image, and calculate the respective degrees of diversity corresponding to the extracted overlapping regions. The fingerprint enrollment apparatus may update the respective degrees of diversity corresponding to the overlapping regions of all current enrolled fingerprint images including the matched input fingerprint image by applying the calculated degrees of diversity to prestored degrees of diversity. The degrees of diversity may be calculated based on the similarity scores described above, but is not limited thereto.

The fingerprint enrollment apparatus may calculate an effective area size of the current enrolled fingerprint images based on the updated degrees of diversity. For example, the fingerprint enrollment apparatus may calculate the effective area size by defining respective weights based on the degrees of diversity and applying the respective weights to sizes of the overlapping regions when calculating a total are size of the current enrolled fingerprint images. Alternatively, the fingerprint enrollment apparatus may calculate the effective area size by defining a correction value based on the degrees of diversity, and applying the correction value to the total area size of the current enrolled fingerprint images, for example, by adding or multiplying the correction value. Alternatively, the fingerprint enrollment apparatus may calculate the effective area size by applying the method of calculating the enrollment score described with reference to FIG. 6, but examples are not limited thereto. In response to an increase in the sizes of the overlapping regions of the current enrolled fingerprint images, the effective area size may decrease. In response to an increase in the degrees of diversity, the effective area size may increase.

Referring back to FIG. 8, comparing between the fingerprint enrollment apparatus measuring respective degrees of diversity corresponding to overlapping regions of the enrolled fingerprint images 810 and respective degrees of diversity corresponding to overlapping regions of the enrolled fingerprint images 820, and calculating an effective area size of the enrolled fingerprint images 810 and an effective area size of the enrolled fingerprint images 820, although the enrolled fingerprint images 820 are more densely distributed than the enrolled fingerprint images 810, the calculated effective area size of the enrolled fingerprint image 820 may be to be greater than the calculated effective area size of the enrolled fingerprint images 810. For example, images corresponding to the overlapping regions of the enrolled fingerprint images 820 may include more images that are deformed as illustrated in FIGS. 5A and 5B, resulting in the effective area size of the enrolled fingerprint images 820 being calculated to have a greater value than the effective area size of the enrolled fingerprint images 810.

Referring back to FIG. 7, in operation 720, the fingerprint enrollment apparatus determines whether to complete or cease the fingerprint enrollment process by comparing the effective area size, for example, $S_{Area}$, of the enrolled fingerprint images to a threshold area size, for example, $Th_{Area}$. In operation 730, in response to the effective area size meeting, e.g., exceeding, the threshold area size, the fingerprint enrollment apparatus completes or ceases the fingerprint enrollment process. Conversely, in response to the effective area size failing to meet, e.g., not exceeding, the threshold area size, the fingerprint enrollment apparatus may request another input fingerprint and receive a corresponding new input fingerprint image to be used for fingerprint enrollment and measures a degree of diversity. Here, for example, the fingerprint enrollment apparatus may include a display and a graphical user interface, or other signaling mechanism, to indicate to the user whether the enrollment process is complete or whether to continue to input fingerprint images.

Figure 9:
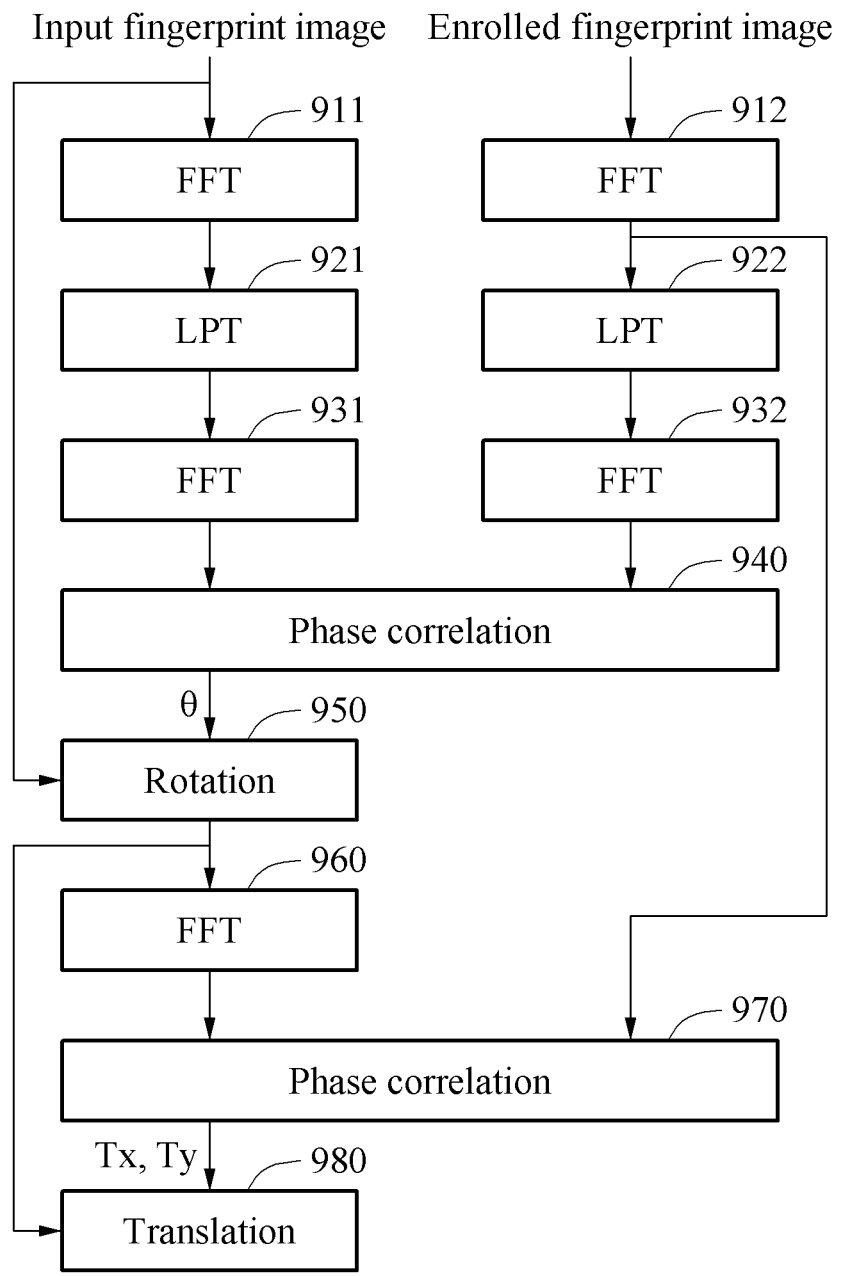
FIG. 9 is a flowchart illustrating an example of a frequency-based matching method.

FIG. 9 is a flowchart illustrating an example of a frequency-based matching method.

The fingerprint enrollment apparatus may employ a frequency-based matching method to match a fingerprint image to another fingerprint image. For example, as illustrated in FIG. 4, using the frequency-based matching method, the fingerprint enrollment apparatus may perform a matching between the input fingerprint image 410 and each of the stored enrolled fingerprint images corresponding to the fingerprint, resulting in the identification of at least the enrolled fingerprint image 420 as match. Here, it is noted that the matching may also result in multiple matches of the stored enrolled fingerprint images. Hereinafter, a process of matching an input fingerprint image to an enrolled fingerprint image will be described.

Referring to FIG. 9, in operations 911 and 912, the fingerprint enrollment apparatus respectively applies a fast Fourier transform (FFT) to an input fingerprint image and an enrolled fingerprint image, and converts time-domain information of the input fingerprint image and the enrolled fingerprint image to frequency-domain information. An image obtained through the FFT and the converting is simply referred to as an FFT image. The frequency-domain information may be based on an orthogonal coordinate system representing information using (x, y) coordinates.

In operations 921 and 922, the fingerprint enrollment apparatus respectively applies a log-polar transform (LPT) to the FFT image of the input fingerprint image and the FFT image of the enrolled fingerprint image, and coverts the coordinate system of the frequency-domain information of each of the FFT images to a polar coordinate system. An image obtained through the LPT and the converting is simply referred to as an LPT image.

For example, the LPT may be performed on a magnitude of each pixel in the FFT image obtained by the FFT. The polar coordinate system may represent information using a radius, an angle, or a combination thereof.

In operations 931 and 932, the fingerprint enrollment apparatus respectively applies an FFT to each of the LPT image of the input fingerprint image and the LPT image of the enrolled fingerprint image. In operation 940, the fingerprint enrollment apparatus performs a phase correlation between the images to which the FFT is applied, and generates rotation information θ between the input fingerprint image and the enrolled fingerprint image. As a result of performing the phase correlation, a peak is detected, and a location of the detected peak may indicate the rotation information θ between the input fingerprint image and the enrolled fingerprint image.

In another example, the location of the detected peak may indicate scale information between the input fingerprint image and the enrolled fingerprint image. For example, one axis of the LPT image may correspond to an angle, and another axis of the LPT image may correspond to a radius. In such an example, the location of the peak detected through the phase correlation may be represented by coordinates of the axis corresponding to the angle and coordinates of the axis corresponding to the radius. The coordinates of the axis corresponding to the angle may indicate the rotation information θ, and the coordinates of the axis corresponding to the radius may indicate the scale information.

In general, there may be no practical change in a scale of a fingerprint image, and thus a radius may be fixed to a preset value, for example, 1. In such a case, the location of the peak detected through the phase correlation may be represented by the coordinates of the axis corresponding to the angle. The coordinates of the axis corresponding to the angle may indicate the rotation information θ.

In operation 950, the fingerprint enrollment apparatus rotates the input fingerprint image based on the rotation information θ. In operation 960, the fingerprint enrollment apparatus applies an FFT to the rotated input fingerprint image. In operation 970, the fingerprint enrollment apparatus performs a phase correlation between the FFT image of the rotated input fingerprint image and the FFT image of the enrolled fingerprint image, and generates translation information (Tx, Ty) between the rotated input fingerprint image and the enrolled fingerprint image. A location of a peak detected as a result of performing the phase correlation may indicate the translation information (Tx, Ty) between the rotated input fingerprint image and the enrolled fingerprint image. In operation 980, the fingerprint enrollment apparatus translates the rotated input fingerprint image based on the translation information (Tx, Ty). The fingerprint enrollment apparatus may then calculate similarity scores between enrolled fingerprint images or degrees of diversity based on a result of the matching.

Figure 10:
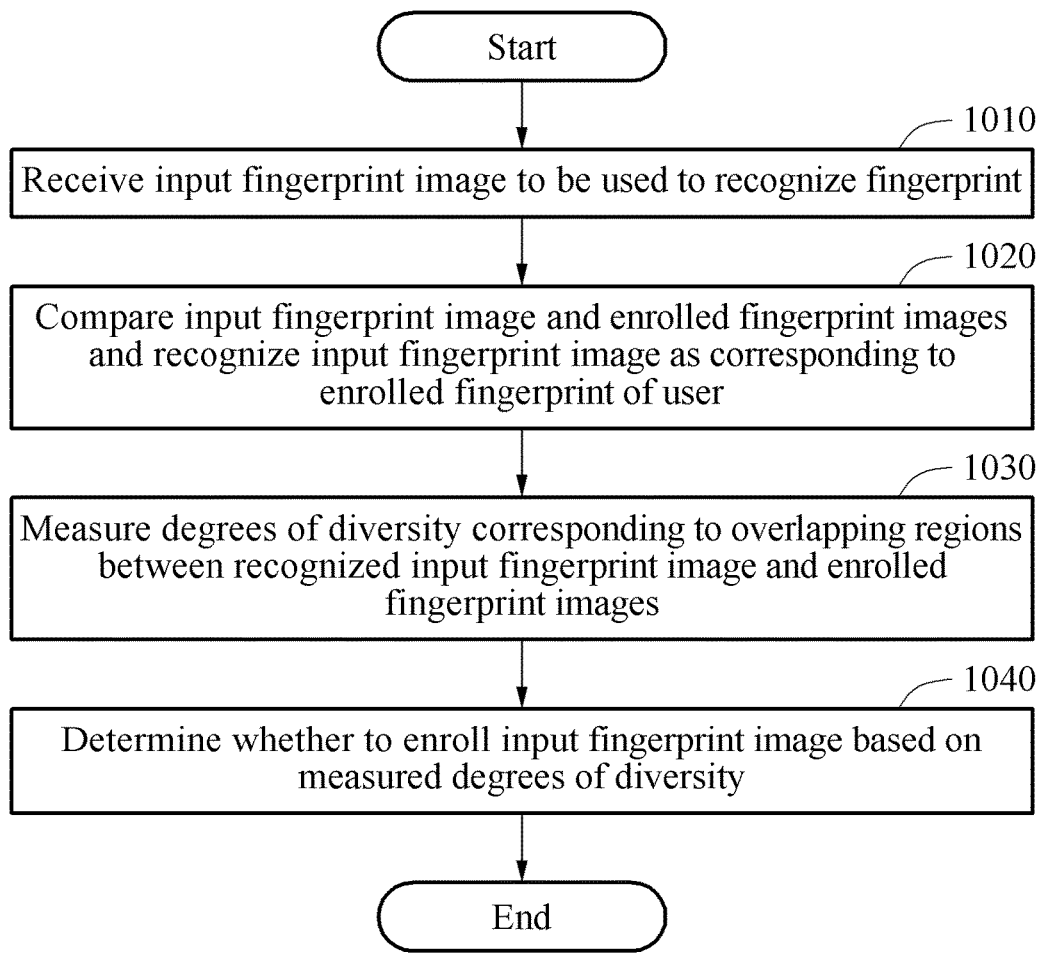
FIG. 10 is a flowchart illustrating an example of a fingerprint enrollment method.

FIG. 10 is a flowchart illustrating an example of a fingerprint enrollment method.

Referring to FIG. 10, in operation 1010, the fingerprint enrollment apparatus, for example, a fingerprint enrollment apparatus 1100 to be described with reference to FIG. 11, receives an input fingerprint image to be used for fingerprint enrollment or recognition, separate examples of which are discussed below. To provide fingerprint-based authentication, the fingerprint enrollment apparatus may store, in a database, enrolled fingerprint images representing a same fingerprint of a user. As described above, when a quantity of information associated with the fingerprint of the user is sufficient to identify the fingerprint, the fingerprint enrollment apparatus may complete or cease the fingerprint enrollment process. The fingerprint recognition process may be performed, for example, when the fingerprint enrollment process is completed or ceased and all enrolled fingerprint images have been stored in the database. In an example, an input fingerprint image that is obtained while performing such user authentication may also be enrolled. For example, existing enrolled fingerprint images may be updated, as discussed above, also during a user authentication process where the user is requested to input a fingerprint image for authentication, even when enrollment has previously been completed or ceased.

Figure 11:
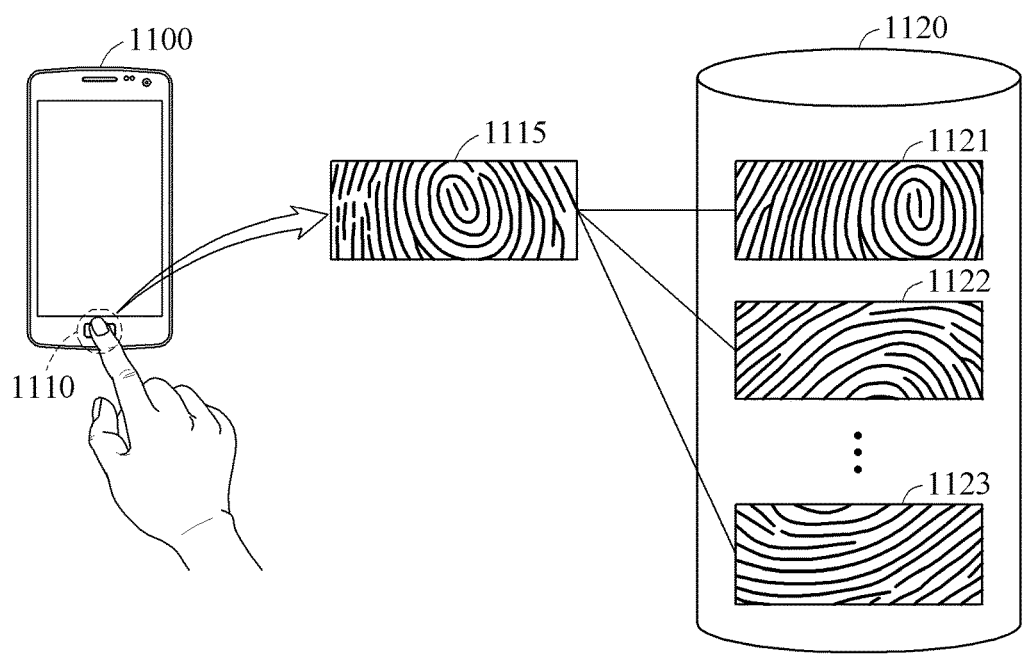
FIG. 11 is a diagram illustrating an example of a fingerprint enrollment method.

Referring to FIG. 11, the fingerprint enrollment apparatus 1100 includes a fingerprint sensor 1110. The fingerprint enrollment apparatus 1100 may control or implement operations to be performed for fingerprint enrollment and/or recognition, and thus may also be referred to as a fingerprint recognition apparatus. Additionally, embodiments may be implemented with separate fingerprint enrollment apparatus(es) and separate fingerprint recognition apparatus(es).

As illustrated in FIG. 11, in the example fingerprint enrollment process the fingerprint enrollment apparatus 1100 receives an input fingerprint image 1115 through the fingerprint sensor 1110, and a database 1120 stores a plurality of enrolled fingerprint images, for example, enrolled fingerprint images 1121 through 1123. The fingerprint enrollment apparatus 1100 selectively updates the enrolled fingerprint images 1121 through 1123 by enrolling the input fingerprint image 1115 based on determined degrees of diversity between the input fingerprint image 1115 and the enrolled fingerprint images 1121 through 1123. In such a case, one of the enrolled fingerprint images 1121 through 1123 stored in the database 1120 may be replaced with the input fingerprint image 1115, or the input fingerprint image 1115 may be added to the enrolled fingerprint images 1121 through 1123. Thus, the fingerprint enrollment apparatus 1100 updates the existing enrolled fingerprint images 1121 through 1123 to add or replace one of the existing enrolled fingerprint images with the input fingerprint image 1115, and updates an enrollment score or an effective area size of the updated enrolled fingerprint images. Here, depending on the enrollment score and/or effective area size, the fingerprint enrollment process may complete or cease.

The fingerprint enrollment apparatus 1100 may then perform the fingerprint recognition process and recognize the input fingerprint image 1115 or another input fingerprint image as corresponding to an enrolled fingerprint of the user by comparing the input fingerprint image 1115 or the other fingerprint image to the updated enrolled fingerprint images. The fingerprint enrollment apparatus 1100 may perform a matching operation, as discussed above, with respect to the input fingerprint image 1115 or the other fingerprint image and the updated enrolled fingerprint images to compare the input fingerprint image 1115 or the other fingerprint image to the updated enrolled fingerprint images. The fingerprint enrollment apparatus 1100 may recognize, or not recognize, the fingerprint of the user based on a result of the matching. Alternatively, as the fingerprint enrollment process may have been completed or ceased upon addition of the input fingerprint image 1115 to the enrolled fingerprint images, the recognition process could be configured to automatically recognize the user upon completion of the fingerprint enrollment process. In addition, as noted above, during the fingerprint recognition process, diversity between the example other input fingerprint image and the existing enrolled fingerprint images may further be calculated, and the other input fingerprint image selectively added to the collection of enrolled fingerprint images or made to replace an existing enrolled fingerprint image.

Returning to the example fingerprint enrollment process with respect to FIGS. 10 and 11, the example input fingerprint image 1115 is received operation 1010, and in operation 1020, the fingerprint enrollment apparatus 1100 may perform the matching process to recognize the input fingerprint image 1115 as corresponding to an enrolled fingerprint of the user by comparing the input fingerprint image 1115 to the enrolled fingerprint images 1121 through 1123. The fingerprint enrollment apparatus 1100 performs the matching operation, as discussed above, with respect to the input fingerprint image 1115 to the enrolled fingerprint images 1121 through 1123 to compare the input fingerprint image 1115 to the enrolled fingerprint images 1121 through 1123. The fingerprint enrollment apparatus 1100 may recognize, or not recognize, the fingerprint of the user based on a result of the matching.

In operation 1030, when the input fingerprint image 115 has been matched with at least one of the enrolled fingerprint images 1121 through 1123, the fingerprint enrollment apparatus 1100 measures degrees of diversity corresponding to overlapping regions between the recognized input fingerprint image 1115 and the corresponding matched enrolled fingerprint images 1121 through 1123. Here, any of the above described methods of measuring the degrees of diversity may be implemented.

In operation 1040, the fingerprint enrollment apparatus 1100 determines whether to enroll the input fingerprint image 1115 based on the measured degrees of diversity. In an example, the fingerprint enrollment apparatus 1100 may compare the existing enrollment score or existing effective area size of the current enrolled fingerprint images 1121 through 1123 to an enrollment score or an effective area size of the updated enrolled fingerprint images including the input fingerprint image 1115. In response to determined increase in the enrollment score or the effective area size, over the current enrollment score or effective area size, meeting or exceeding a threshold value, the fingerprint enrollment apparatus 1100 may enroll the input fingerprint image 1115 and update the enrolled fingerprint images 1121 through 1123. Alternatively, the fingerprint enrollment apparatus 1100 may replace, with the input fingerprint image 1115, one of the enrolled fingerprint images 1121 through 1123, for example, an enrolled fingerprint image that has a determined smallest value of a contribution to the enrollment score or the effective area size. The fingerprint enrollment apparatus 1100 enrolls the input fingerprint image 1115 to update the enrolled fingerprint images 1121 through 1123.

Figure 12A:
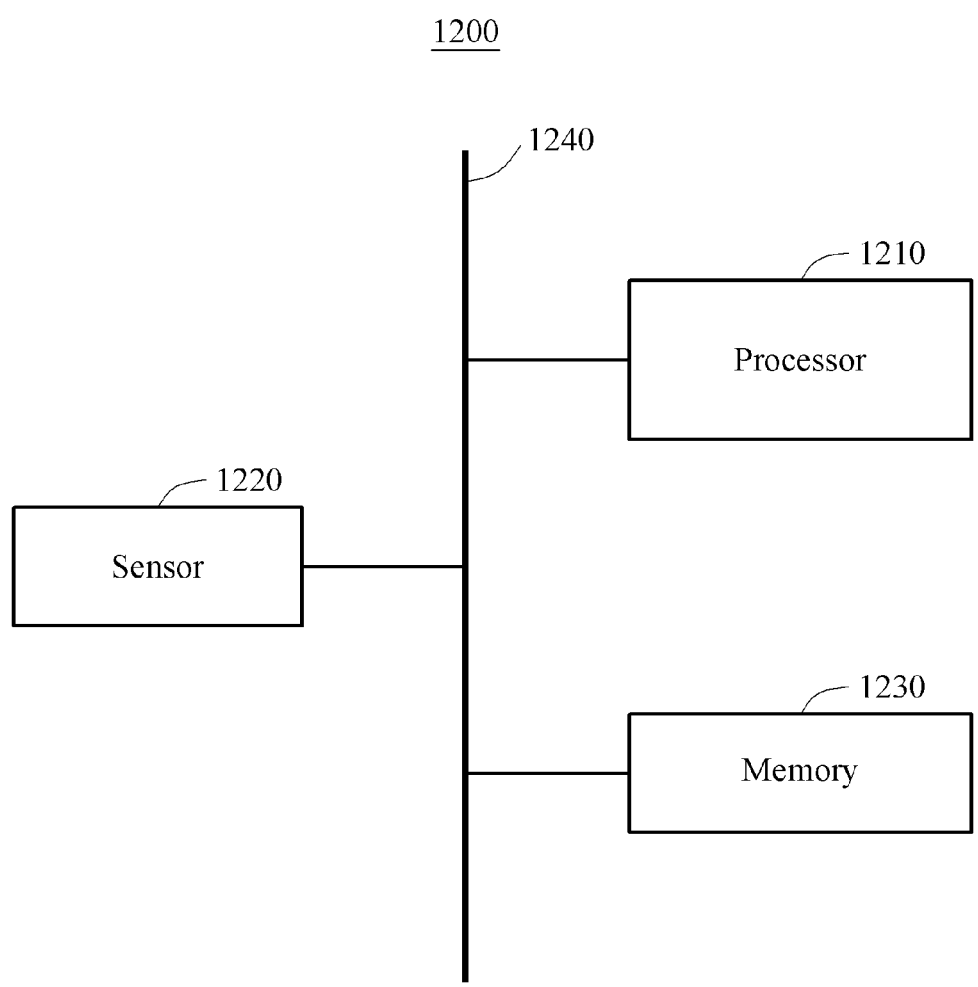
FIGS. 12A-12B are diagrams illustrating examples of a fingerprint enrollment apparatus.
Figure 12B:
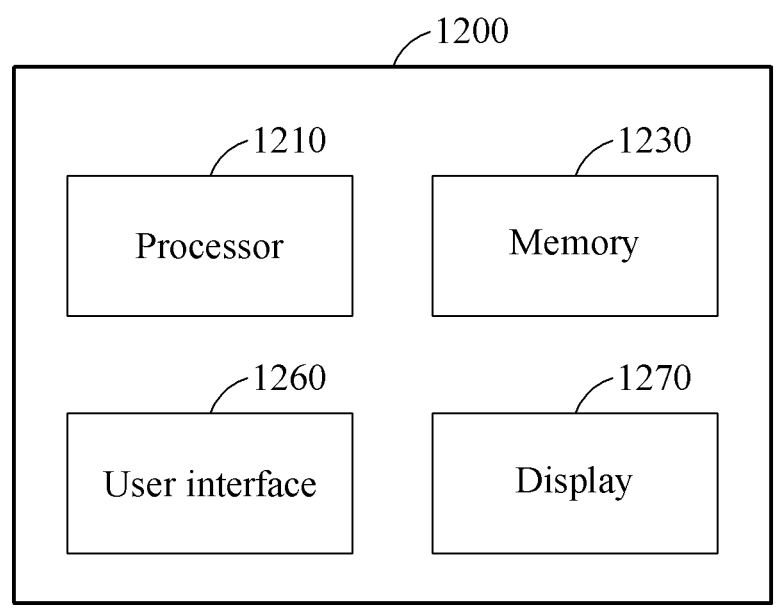

FIGS. 12A and 12B are diagrams illustrating examples of a fingerprint enrollment apparatus.

Referring to FIG. 12A, a fingerprint enrollment apparatus 1200 includes a sensor 1220, a processor 1210, and a memory 1230. The sensor 1220, the processor 1210, and the memory 1230 may communicate with one another through a bus 1240. Similarly, FIG. 12B illustrates the fingerprint enrollment apparatus 1200 including a user interface 1260, a display 1270, and such a processor 1210 and memory 1230. Likewise, the bus 1240 demonstrated in FIG. 12A may also be available for communication between components of the fingerprint enrollment apparatus 1200 of FIG. 12B.

The sensor 1220 illustrated in FIG. 12A may be a fingerprint sensor. In addition, the sensor 1220 may be included in, and represented by, either or both of the user interface 1260 and display 1270 illustrated in FIG. 12B, e.g., depending on embodiment and implementation of the fingerprint sensor.

For example, the user interface 1260 may include a fingerprint sensor with imaging sensor or display 1270 may be configured for both outward illumination and inward image capturing. Accordingly, below references the sensor 1220 may equally apply to the configuration and operations of the user interface 1260 and display 1270. Thus, for example, the sensor 1220 may capture a fingerprint image using a well-known method, for example, a method of converting an optical image to an electrical signal. The fingerprint image may be output to the processor 1210.

The processor 1210 may include one or more or all of the components or devices described with reference to FIGS. 1 through 11, or perform one or more or all of the processes and methods described with reference to FIGS. 1 through 11. The memory 1230 may store fingerprint images that are captured by the sensor 1220 as well as such captured and enrolled fingerprints, and the memory 1240 may also store fingerprints enrolled from an external or remote device or alternative sensor or user interface. Thus, according to one or more embodiments, the memory 1230 may store an input fingerprint image captured by the sensor 1220, a result of matching performed by the processor 1210, and/or a degree of diversity, a similarity, a similarity score, an enrollment score, and an effective area size that are calculated by the processor 1210. The memory 1230 may be a volatile memory or a nonvolatile memory.

The processor 1210 may execute processing instructions, such as in the form of a program, and control the fingerprint enrollment apparatus 1200 accordingly. For example, such a program code to be executed by the processor 1210 may be stored in the memory 1230. The fingerprint enrollment apparatus 1200 may be representative of or connected to an external device, for example, a personal computer (PC) and a network, through the user interface 1260 of FIG. 12B as an input and output device, and exchange data with the external device.

The fingerprint enrollment apparatus 1200 may include various electronic systems, for example, mobile devices including, for example, a mobile phone, a smartphone, a personal digital assistant (PDA), a tablet computer, and a laptop computer, computing devices including, for example, a PC, a tablet computer, and a netbook, and electronic products including, for example, a television (TV), a smart TV, and a security device for gate control. As only an example, FIG. 11 illustrates an example where the fingerprint enrollment apparatus 1200 may be such a mobile phone, smartphone, PDA, or tablet computer.

Although examples of methods of enrolling a fingerprint of a user using a portion or an entirety of the fingerprint of the user are described above, such examples may be expanded to cases of enrolling a portion or an entirety of information on the fingerprint of the user and/or other biodata of the user. As only examples, the other biodata may include, for example, information on blood vessels of the user and information on an iris of the user. In such a case, the processor 1210 may receive input partial data corresponding to a portion of the biodata of the user from the sensor 1220, compare the input partial data to enrolled partial data corresponding partial data of enrolled biodata, and enroll the input partial data based on a result of the comparing.

For example, the sensor 1220 may include an image sensor configured to recognize a vein pattern of the user. The sensor 1220 may extract the vein pattern from skin of a dorsal side of a hand of the user. The sensor 1220 may obtain an image including the vein pattern by maximizing a contrast of brightness of blood vessels of the user against the skin of the user using an infrared lighting and a filter. The sensor 1220 may obtain a partial image corresponding to a portion of the vein pattern. In such an example, the processor 1210 may compare the partial image corresponding to the portion of the vein pattern to enrolled partial images of the vein pattern, and enroll the obtained partial image.

For another example, the sensor 1220 may include a camera or iris sensor configured to recognize an iris pattern of the user. The sensor 1220 may scan or capture the iris pattern between a pupil of the user and a sclera, a white area of an eye, of the user. The sensor 1220 may obtain a partial image corresponding to a portion of the iris pattern. In such an example, the processor 1210 may compare the partial image corresponding to the portion of the iris pattern to enrolled partial images of the iris pattern, and enroll the obtained partial image.

The computing devices, mobile devices, fingerprint enrollment apparatus, fingerprint recognition apparatus, fingerprint enrollment apparatus 1100, fingerprint enrollment apparatus 1200, fingerprint sensor 1110, database 1120, sensor 1220, processor 1210, memory 1230, bus 1240, user interface 1260, and display 1270 in FIGS. 11-12B that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented fingerprint enrollment method comprising:
performing a matching between a received input fingerprint image of a user and one or more enrolled fingerprint images to identify a matched enrolled fingerprint image from the one or more enrolled fingerprint images;
extracting, corresponding to where the input fingerprint and the matched enrolled fingerprint are determined to overlap, a first shared region of the input fingerprint image and a second shared region of the identified matched enrolled fingerprint image overlapping the first shared region; and
selectively, based on a calculated degree of diversity between the first shared region of the input fingerprint image and the second shared region of the matched enrolled fingerprint image, storing the input fingerprint as another enrolled fingerprint image.

2. The method of claim 1, wherein the selective storing of the input fingerprint further comprises:
calculating the degree of diversity in the fingerprint corresponding to the first shared region and the second shared region;
selectively storing the input fingerprint image as the other enrolled fingerprint image based on the calculated degree of diversity.

3. The method of claim 2, wherein the selective storing of the input fingerprint image includes selecting, dependent on the calculated degree of diversity, between a first of storing the input fingerprint image as the other enrolled fingerprint image and a second of requesting the user to input another finger fingerprint image and not storing the input fingerprint image as the other enrolled fingerprint image.

4. The method of claim 3, wherein the selective storing of the input fingerprint image further includes, dependent on a determined total number of stored enrolled fingerprint images and/or a calculated effective area size corresponding the stored enrolled fingerprint images, not requesting the user to input the other fingerprint image and ceasing an enablement process of the enablement method.

5. The method of claim 1, further comprising calculating the degree of diversity, including:
calculating a similarity score between the input fingerprint image and the matched enrolled fingerprint image based on a calculated similarity between the first shared region and the second shared region,
wherein, a relationship between the similarity score and the degree of diversity exists such that, in response to an increase in the similarity score, the degree of diversity decreases, and in response to a decrease in the similarity score, the degree of diversity increases.

6. The method of claim 5, wherein the calculating of the similarity score comprises:
calculating the similarity between the first shared region and the second shared region; and
calculating the similarity score based on the calculated similarity and a determined size of the first shared region or the second shared region.

7. The method of claim 6, wherein the calculating of the similarity score comprises:
calculating the similarity based on a normalized cross correlation (NCC) or a phase correlation between the input fingerprint image and the matched enrolled fingerprint image.

8. The method of claim 5, wherein the calculating of the similarity score comprises:
calculating a shared area ratio based on a first ratio between a size of the first shared region or the second shared region and a size of the input fingerprint image or based on a second ratio between the size of the first shared region or the second shared region and a size of the matched enrolled fingerprint image; and
calculating the similarity score based on the calculated shared area ratio and the calculated similarity.

9. The method of claim 8, wherein,
in response to the calculated similarity meeting a similarity threshold, the shared area ratio is the first ratio or the second ratio,
in response to the similarity failing to meet the similarity threshold, the shared area ratio is a predefined value, and
the similarity score is based on a multiplication of the shared area ratio and the calculated similarity.

10. The method of claim 1, further comprising determining whether to cease a fingerprint enrollment process, including:
calculating an enrollment score of plural enrolled fingerprint images, including the one or more enrolled fingerprint images and the stored other enrolled fingerprint image, based on a number of the plural enrolled fingerprint images and similarity scores between the plural enrolled fingerprint images; and
determining whether to cease the fingerprint enrollment process by comparing the enrollment score to a threshold score.

11. The method of claim 10, wherein the calculating of the enrollment score comprises:
calculating the enrollment score to be at least one $S_{Enroll}$ of:

$$S_{Enroll} = \frac{m(m-1)}{2} - \sum_{i=1}^{m-1}\sum_{j=i+1}^{m} s_{ij} + \sum_{i=1}^{m-2}\sum_{j=i+1}^{m-1}\sum_{k=j+1}^{m} s_{ij}s_{jk};$$

$$S_{Enroll} = \frac{m(m-1)}{2} - \sum_{i=1}^{m-1} \max_{i<j \leq m} s_{ij};$$

$$S_{Enroll} = \sum_{i=1}^{m}\left(1 - \max_{1 \leq j \leq m, j \neq i} s_{ij}\right); \text{ or}$$

$$S_{Enroll} = \frac{m(m-1)}{2} - \sum_{i=1}^{m-1} \sum_{j=i+1}^{m} s_{ij},$$

wherein m denotes the number of the plural enrolled fingerprint images, and $S_{ij}$ denotes a similarity score between an i-th enrolled fingerprint image and a j-th enrolled fingerprint image of the plural enrolled fingerprint images.

12. The method of claim 1, further comprising determining whether to cease a fingerprint enrollment process, including:
updating respective degrees of diversity corresponding to respective overlapping regions, with respect to the input fingerprint image, of plural enrolled fingerprint images, including the one or more enrolled fingerprint images and the stored other enrolled fingerprint image, based on the calculated degree of diversity;
calculating an effective area size of the plural enrolled fingerprint images based on the updated degrees of diversity; and
determining whether to cease the fingerprint enrollment process by comparing the calculated effective area size to a threshold area size.

13. The method of claim 12,
wherein a relationship between a size of the respective overlapping regions and the effective area size exists such that, in response to an increase in size of the respective overlapping regions of the plural enrolled fingerprint images, the effective area size decreases, and
wherein a relationship between the updated respective degrees of diversity and the effective area size exists such that, in response to an increase in the updated degrees of diversity, the effective area size increases.

14. The method of claim 1, further comprising calculating the degree of diversity, where a result of the calculating of the degree of diversity is dependent on at least one of
a direction of a fingerprint corresponding to the input fingerprint image,
a direction, a distribution, and a magnitude of a finger pressure corresponding to the input fingerprint image, and
a humidity and/or other condition of a portion of skin corresponding to the input fingerprint image.

15. The method of claim 1, wherein the matching comprises:
obtaining at least one phase correlation between the input fingerprint image and the one or more enrolled fingerprint images based on a frequency-based matching method;
obtaining at least one of a translation, a rotation, or a scale between the input fingerprint image and the one or more enrolled fingerprint images based on the obtained phase correlation; and
determining whether, and which of, any of the one or more enrolled fingerprint images match the input fingerprint image based on at least one of the obtained translation, the obtained rotation, or the obtained scale.

16. The method of claim 1, further comprising performing a recognition process to compare the input fingerprint image or another input fingerprint image to at least the one or more enrolled fingerprint images and selectively enable user access to stored information of a computing device that performs a fingerprint enrollment process including the selective storing the input fingerprint image as another enrolled fingerprint image.

17. A processor implemented fingerprint enrollment method comprising:
comparing an input fingerprint image of a user to multiple enrolled fingerprint images, to recognize the input fingerprint image as having matched correspondence to an enrolled fingerprint of the user based on a result of the comparing;
measuring respective degrees of diversity corresponding to one or more overlapping regions between the recognized input fingerprint image and one or matched enrolled fingerprint images of the multiple enrolled fingerprint images; and
determining whether to enroll the input fingerprint image based on the measured respective degrees of diversity,
wherein the respective degrees of diversity are calculated by calculating respective similarities between a first shared region of the input fingerprint image corresponding to the one or more overlapping regions and respective second shared regions of the one or more matched enrolled fingerprint images corresponding to the one or more overlapping regions.

18. A non-transitory computer-readable storage medium storing instructions, that when executed by a processor, cause the processor to perform the method of claim 1.

19. A fingerprint enrollment apparatus comprising:
a fingerprint sensor configured to receive an input fingerprint image of a user; and
a processor configured to
perform a matching of the input fingerprint image to one or more enrolled fingerprint images to identify a matched enrolled fingerprint image,
extract, corresponding to where the input fingerprint and the matched enrolled fingerprint are determined to overlap, a first shared region of the input fingerprint image and a second shared region of the identified matched enrolled fingerprint image overlapping the first shared region,
calculate a degree of diversity between the first shared region and the second shared region, and
determine whether to store the input fingerprint image as another enrolled fingerprint image based on the calculated degree of diversity.

20. The fingerprint enrollment apparatus of claim 19, wherein the processor is configured to calculate a similarity score between the input fingerprint image and the matched enrolled fingerprint image based on a calculated similarity between the first shared region and the second shared region,
wherein, a relationship between the similarity score and the degree of diversity exists such that, in response to an increase in the similarity score, the degree of diversity decreases, and in response to a decrease in the similarity score, the degree of diversity increases.

21. The fingerprint enrollment apparatus of claim 20, wherein the processor is configured to calculate the similarity between the first shared region and the second shared region, and calculate the similarity score based on the calculated similarity and a determined size of the first shared region or the second shared region.

22. The fingerprint enrollment apparatus of claim 20, wherein the processor is configured to calculate a shared area ratio based on a first ratio between a size of the first shared region or the second shared region and a size of the input fingerprint image or based on a second ratio between the size of the first shared region or the second shared region and a size of the matched enrolled fingerprint image, and calculate the similarity score based on the calculated shared area ratio and the similarity.

23. The fingerprint enrollment apparatus of claim 20, wherein the processor is configured to calculate an enrollment score of plural enrolled fingerprint images, including the one or more enrolled fingerprint images and the stored other enrolled fingerprint image, based on a number of the plural enrolled fingerprint images and similarity scores of the plural enrolled fingerprint images, and determine whether to cease a fingerprint enrollment process by comparing the calculated enrollment score to a threshold score.

24. The fingerprint enrollment apparatus of claim 19, wherein the processor is configured to update respective degrees of diversity corresponding to the respective overlapping regions, with respect to the input fingerprint image, of plural enrolled fingerprint images, including the one or more enrolled fingerprint images and the stored other enrolled fingerprint image, based on the calculated degree of diversity, calculate an effective area size of the plural enrolled fingerprint images based on the updated respective degrees of diversity, and determine whether to cease a fingerprint enrollment process by comparing the calculated effective area size to a threshold area size.

25. The fingerprint enrollment apparatus of claim 19, wherein the processor is further configured to perform a recognition process to compare the input fingerprint image or another input fingerprint image to at least the one or more enrolled fingerprint images to selectively enable user access to stored information of the enrollment apparatus.

26. The fingerprint enrollment apparatus of claim 25, further comprising another fingerprint sensor, wherein the processor is further configured to perform the recognition process to compare the other input fingerprint image captured by the other fingerprint sensor to at least the one or more enrolled fingerprint images and selectively enable user access to stored information of the enrollment apparatus based on a result of the recognition process,
wherein the other fingerprint sensor has a different image capturing configuration than the fingerprint sensor, so as to capture a different fingerprint image shape or size than captured by the fingerprint sensor.

27. An enrollment apparatus comprising:
a processor configured to
perform a matching of an input bio-image of a user to one or more enrolled bio-images to identify a matched enrolled bio-image,
extract, corresponding to where the input bio-image and the matched enrolled bio-image are determined to overlap, a first shared region of the input bio-image and a second shared region of the identified matched enrolled bio-image overlaying the first shared region
calculate a degree of diversity between the first shared region and the second shared region, and
determine whether to store the input bio-image as another enrolled bio-image image based on the calculated degree of diversity.

28. The enrollment apparatus of claim 27, further comprising a bio-sensor configured to receive the input bio-image of the user.

29. The enrollment apparatus of claim 28, wherein the bio-sensor is a fingerprint sensor configured to capture only a portion of a corresponding fingerprint corresponding to a sensor area of the fingerprint sensor, with the input bio-image being a corresponding input fingerprint image of only the portion of the corresponding fingerprint.

* * * * *